(12) United States Patent
Yano et al.

(10) Patent No.: US 11,607,966 B2
(45) Date of Patent: Mar. 21, 2023

(54) CONTROL DEVICE FOR MOBILE BODY, CONTROL METHOD THEREFOR, AND MOBILE BODY

(71) Applicants: HONDA MOTOR CO., LTD., Tokyo (JP); FUJI ELECTRIC CO., LTD., Kawasaki (JP)

(72) Inventors: Mitsuteru Yano, Tokyo (JP); Shinichi Yokoyama, Wako (JP); Masahiko Sato, Tokyo (JP); Tomoki Nakahara, Suzuka (JP)

(73) Assignees: Honda Motor Co., Ltd., Tokyo (JP); Fuji Electric Co., Ltd., Kanagawa (JP)

( * ) Notice: Subject to any disclaimer, the term of this patent is extended or adjusted under 35 U.S.C. 154(b) by 0 days.

(21) Appl. No.: 17/483,217

(22) Filed: Sep. 23, 2021

(65) Prior Publication Data

US 2022/0097541 A1 Mar. 31, 2022

(30) Foreign Application Priority Data

Sep. 28, 2020 (JP) .............................. JP2020-161852

(51) Int. Cl.
*B60L 53/22* (2019.01)
*B60L 53/14* (2019.01)

(52) U.S. Cl.
CPC ............... *B60L 53/22* (2019.02); *B60L 53/14* (2019.02); *B60L 2210/30* (2013.01)

(58) Field of Classification Search
CPC ...... B60L 53/22; B60L 53/14; B60L 2210/30; B60L 2270/20; B60L 1/006; B60L 3/0023; Y02T 10/70; Y02T 10/7072; Y02T 90/12; Y02T 90/14

USPC ......................................................... 320/109
See application file for complete search history.

(56) References Cited

U.S. PATENT DOCUMENTS

2012/0112693 A1* 5/2012 Kusch .................... B60L 53/22
320/109

FOREIGN PATENT DOCUMENTS

| JP | 2014-075853 A | 4/2014 |
| JP | 2015-015829 A | 1/2015 |
| JP | 2015-050894 A | 3/2015 |

OTHER PUBLICATIONS

European search report dated Feb. 16, 2022 issued over the corresponding European Patent Application No. 21199176.5.

* cited by examiner

*Primary Examiner* — Paul Dinh
(74) *Attorney, Agent, or Firm* — Carrier Shende & Associates, P.C.; Joseph P. Carrier; Fulchand P. Shende

(57) ABSTRACT

A control device for a mobile body is equipped with a charging and electrical power supplying unit including a first smoothing capacitor positioned on a connector side and a second smoothing capacitor positioned on a battery side, and a control unit configured to control the charging and electrical power supplying unit. When the battery is charged using electrical power supplied from the electrical power source device, the control unit completes precharging a first smoothing capacitor and a second smoothing capacitor using electrical power supplied from the battery, before the electrical power from the electrical power source device starts to be supplied to the charging and electrical power supplying unit.

10 Claims, 3 Drawing Sheets

CONTROL DEVICE FOR MOBILE BODY, CONTROL METHOD THEREFOR, AND MOBILE BODY

CROSS-REFERENCE TO RELATED APPLICATION

This application is based upon and claims the benefit of priority from Japanese Patent Application No. 2020-161852 filed on Sep. 28, 2020, the contents of which are incorporated herein by reference.

BACKGROUND OF THE INVENTION

Field of the Invention

The present invention relates to a control device for a mobile body, a control method therefor, and a mobile body.

Description of the Related Art

In JP 2014-075853 A, a vehicle control device including a charging/discharging device is disclosed. The charging/discharging device receives electrical power supplied from an electrical power source device positioned externally of a vehicle, and is capable of charging an electrical energy storage device. Also, the charging/discharging device is capable of supplying the power (energy) stored in the electrical energy storage device to a load positioned externally of the vehicle. The charging/discharging device is provided with a precharging circuit on an inlet side thereof. The precharging circuit includes an inrush current prevention resistor and a relay for current to flow without the inrush current prevention resistor.

SUMMARY OF THE INVENTION

There is a long awaited need for dispensing with the precharging circuit or the like on an inlet side to realize downsizing. At the same time, however, there is a concern that reliability will be decreased if the precharging circuit or the like on the inlet side is simply omitted.

An object of the present invention is to solve the aforementioned problem.

A control device for a mobile body according to one aspect of the present invention includes a charging and electrical power supplying unit configured to convert AC power supplied from an electrical power source device positioned externally of the mobile body via a connector into DC power to charge a battery provided in the mobile body, and configured to convert DC power supplied from the battery into AC power to supply the AC power to an electrical load positioned externally of the mobile body, the charging and electrical power supplying unit including a first smoothing capacitor positioned on a connector side and a second smoothing capacitor positioned on a battery side; and a control unit configured to control the charging and electrical power supplying unit, wherein in a case that the battery is charged using electrical power supplied from the electrical power source device, the control unit completes precharging the first smoothing capacitor and the second smoothing capacitor using electrical power supplied from the battery, before the electrical power from the electrical power source device starts to be supplied to the charging and electrical power supplying unit.

A mobile body according to another aspect of the present invention is equipped with the control device for the mobile body as described above.

A method of controlling a control device for a mobile body according to another further aspect of the present invention, in which the control device is equipped with a charging and electrical power supplying unit configured to convert AC power supplied from an electrical power source device positioned externally of the mobile body via a connector into DC power to charge a battery provided in the mobile body, and configured to convert DC power supplied from the battery into AC power to supply the AC power to an electrical load positioned externally of the mobile body, the charging and electrical power supplying unit including a first smoothing capacitor positioned on a connector side and a second smoothing capacitor positioned on a battery side, the method includes performing precharging of the first smoothing capacitor and precharging of the second smoothing capacitor using electrical power supplied from the battery, before electrical power from the electrical power source device starts to be supplied to the charging and electrical power supplying unit, and starting to supply electrical power to the charging and electrical power supplying unit from the electrical power source device and charging the battery using the electrical power supplied from the electrical power source device, after the precharging of the first smoothing capacitor and the precharging of the second smoothing capacitor are completed.

According to the present embodiment, it is possible to provide the control device for the mobile body that can realize downsizing without causing a decrease in reliability, as well as the control method therefor, and the mobile body that is equipped with the control device for the mobile body.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Embodiment

Figure 1:
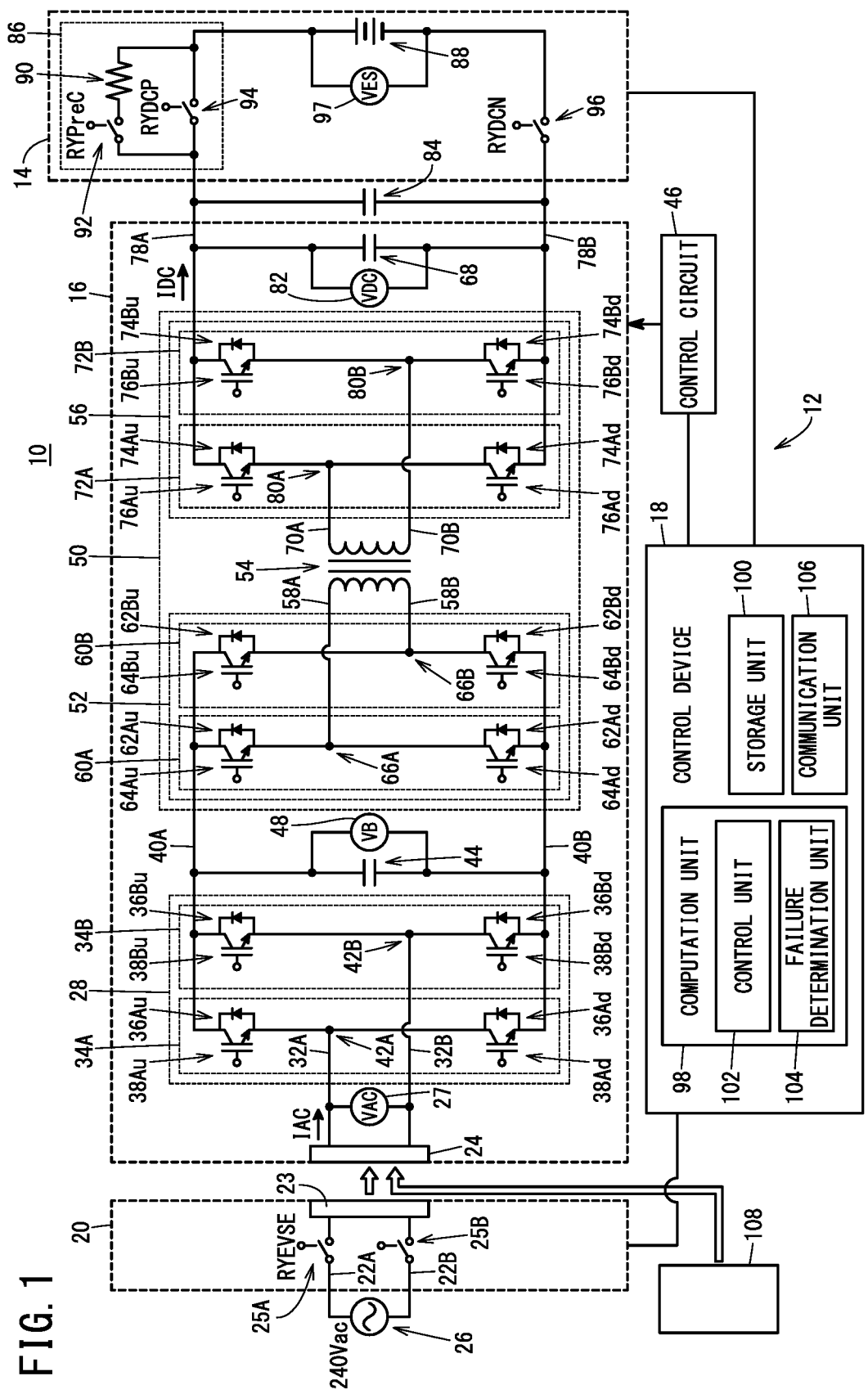
FIG. 1 is a block diagram showing a mobile body equipped with a control device for the mobile body according to an embodiment.

A mobile body control device and a control method therefor according to an embodiment, as well as a mobile body according to an embodiment of the present invention will be described below with reference to the accompanying drawings. FIG. 1 is a block diagram showing a mobile body equipped with a control device for the mobile body according to a present embodiment. In this instance, an exemplary case will be described in which a mobile body 10 is a vehicle, although the mobile body 10 is not limited to being a vehicle. For example, the mobile body 10 may be a robot or the like.

As shown in FIG. 1, the mobile body 10 includes a control device 12 for the mobile body, and a rechargeable energy storage system (REESS: REchargeable Energy Storage System) 14. The control device 12 for the mobile body is capable of carrying out charging and supply of electrical power. The rechargeable energy storage system 14 is capable of storing electrical power. It should be noted that, although the mobile body 10 is also equipped with constituent elements other than these constituent elements, illustration of such other constituent elements is omitted herein.

The control device (charging/discharging device) 12 for the mobile body is equipped with a charging and electrical power supplying unit (charging/discharging unit) 16. The control device 12 for the mobile body is provided with a plurality of operation modes, and more specifically, a charging mode, and an electrical power supplying mode. In the charging mode, the charging and electrical power supplying unit 16 is capable of converting AC power supplied from an electrical power source device 20 positioned externally of the mobile body 10 into DC power, and is capable of charging a later-described battery 88 provided in the mobile body 10. In the electrical power supplying mode, the charging and electrical power supplying unit 16 is capable of converting the DC power supplied from the battery 88 into AC power, and supplying the AC power to an electrical load 108 positioned externally of the mobile body 10. The operation modes of the control device 12 for the mobile body can be determined by a control unit 102 to be described later.

When charging the battery 88 is carried out, the electrical power source device 20 positioned externally of the mobile body 10 is electrically connected to the charging and electrical power supplying unit 16. As an example of the electrical power source device 20, there may be cited EVSE (Electric Vehicle Supply Equipment), although the electrical power source device 20 is not limited to such equipment. EVSE is defined by a charging cable that is used in vehicles such as plug-in hybrid vehicles and electric vehicles. The electrical power source device 20 is provided with functions to detect the state of the electrical power source device 20, the state of the mobile body 10, and the like. In addition, the electrical power source device 20 is further provided with a function to control charging.

The electrical power source device 20 may be supplied with AC power from an AC power source 26. An AC voltage supplied from the AC power source 26, for example, is on the order of 240 V, however, the present invention is not limited to this feature. The electrical power source device 20 is equipped with a connector 23, and more specifically, a charging connector. The AC power supplied from the AC power source 26 can be supplied to the connector 23 via wirings 22A and 22B provided in the electrical power source device 20. The mobile body 10 is equipped with a connector 24, and more specifically, an inlet. The connector 24 is connected to a pair of wirings 32A and 32B provided in the charging and electrical power supplying unit 16. When charging the battery 88 is carried out, the connector 23 and the connector 24 can be connected.

Switches 25A and 25B are respectively provided in the pair of wirings 22A and 22B provided in the electrical power source device 20. As the switches 25A and 25B, for example, relay contacts or the like can be used, however, the switches 25A and 25B are not limited to this feature. When the switches 25A and 25B are in an OFF state, the AC power from the AC power source 26 is not supplied to the charging and electrical power supplying unit 16. When the switches 25A and 25B are placed in an ON state, the AC power from the AC power source 26 is supplied to the charging and electrical power supplying unit 16 via the wirings 22A and 22B, the switches 25A and 25B, the connectors 23 and 24.

When supply of electrical power is carried out with respect to the electrical load 108 positioned externally of the mobile body 10, the electrical load 108 is electrically connected to the charging and electrical power supplying unit 16. More specifically, a non-illustrated connector provided on the electrical load 108 is connected to the connector 24 provided in the mobile body 10.

The charging and electrical power supplying unit 16 is provided with a voltage sensor (detection unit) 27. One end of the voltage sensor 27 is connected to the wiring 32A. Another end of the voltage sensor 27 is connected to the wiring 32B. The voltage sensor 27 is capable of detecting a voltage VAC between the pair of wirings 32A and 32B. That is, the voltage sensor 27 is capable of detecting a voltage supplied from the electrical power source device 20 to the control device 12 for the mobile body.

The charging and electrical power supplying unit 16 comprises a power conversion unit (first power conversion unit) 28, a smoothing capacitor (first smoothing capacitor, connector side smoothing capacitor) 44, and a power conversion unit (second power conversion unit) 50. The charging and electrical power supplying unit 16 comprises a smoothing capacitor (second smoothing capacitor, battery side smoothing capacitor) 68. An AC/DC conversion unit that mutually converts the AC power of the connector 24 and the DC power on the side of the battery 88 is constituted by the power conversion unit 28, the smoothing capacitor 44, the power conversion unit 50, and the smoothing capacitor 68.

The AC power supplied from the electrical power source device 20 can be supplied to the power conversion unit 28 via the wirings 32A and 32B. In the charging mode, the power conversion unit 28 is capable of converting the AC power supplied from the electrical power source device 20 into DC power, and supplying the DC power to the side of the smoothing capacitor 44. Further, in the electrical power supplying mode, the power conversion unit 28 is capable of converting the DC power supplied from the side of the smoothing capacitor 44 into AC power, and supplying the AC power to the side of the connector 24.

The power conversion unit 50 is equipped with a conversion unit 52, an isolation transformer 54, and a conversion unit 56. The power conversion unit 50 is capable of transferring and receiving electrical power via the isolation transformer 54. DC power supplied from the side of the smoothing capacitor 44 positioned on the side of the connector 24 with respect to the isolation transformer 54 can be converted into AC power by the conversion unit 52. The AC power can be supplied to the side of the conversion unit 56 via the isolation transformer 54. The AC power transferred and received via the isolation transformer 54 can be converted into DC power by the conversion unit 56. The DC power can be supplied to the side of the smoothing capacitor 68 positioned on the side of the battery 88 with respect to the isolation transformer 54. DC power supplied from the side of the smoothing capacitor 68 positioned on the side of the battery 88 with respect to the isolation transformer 54 can be converted into AC power by the conversion unit 56. The AC power can be supplied to the side of the conversion unit 52 via the isolation transformer 54. The AC power transferred and received via the isolation transformer 54 can be converted into DC power by the conversion unit 52. The DC power can be supplied to the side of the smoothing capacitor 44 positioned on the side of the connector 24 with respect to the isolation transformer 54.

The power conversion unit 28 is equipped with power element units 34A and 34B corresponding to the pair of wirings 32A and 32B, respectively.

The power element unit 34A corresponding to the wiring 32A is equipped with a diode 36Au on the side of an upper arm, a diode 36Ad on the side of a lower arm, a switching element (semiconductor switching element) 38Au on the side of the upper arm, and a switching element 38Ad on the side of the lower arm.

The power element unit 34B corresponding to the wiring 32B is equipped with a diode 36Bu on the side of an upper arm, a diode 36Bd on the side of a lower arm, a switching element 38Bu on the side of the upper arm, and a switching element 38Bd on the side of the lower arm.

When describing the diodes on the side of the upper arm in general, the reference numeral 36$u$ will be used, and when describing the individual diodes on the side of the upper arm, the reference numerals 36Au and 36Bu will be used. Further, when describing the diodes on the side of the lower arm in general, the reference numeral 36$d$ will be used, and when describing the individual diodes on the side of the lower arm, the reference numerals 36Ad and 36Bd will be used.

When describing the switching elements in general, the reference numeral 38 will be used, and when describing the individual switching elements, the reference numerals 38Au, 38Ad, 38Bu, and 38Bd will be used. Further, when describing the switching elements on the side of the upper arm in general, the reference numeral 38$u$ will be used, and when describing the individual switching elements on the side of the upper arm, the reference numerals 38Au and 38Bu will be used. Further, when describing the switching elements on the side of the lower arm in general, the reference numeral 38$d$ will be used, and when describing the individual switching elements on the side of the lower arm, the reference numerals 38Ad and 38Bd will be used.

As the switching elements 38, for example, insulated gate bipolar transistors (IGBT) can be used therefor, however, the switching elements 38 are not limited to this feature. FETs (Field Effect Transistors) may also be used as the switching elements 38.

The diode 36$u$ on the side of the upper arm and the diode 36$d$ on the side of the lower arm are connected in series with each other. The cathode of the diode 36$u$ on the side of the upper arm is connected to one wiring 40A from among a pair of wirings 40A and 40B. The anode of the diode 36$u$ on the side of the upper arm is connected to the cathode of the diode 36$d$ on the side of the lower arm. The anode of the diode 36$d$ on the side of the lower arm is connected to another wiring 40B from among the pair of wirings 40A and 40B.

A rectifier circuit is constituted by these diodes 36Au, 36Ad, 36Bu, and 36Bd.

The switching element 38$u$ on the side of the upper arm and the switching element 38$d$ on the side of the lower arm are connected in series with each other. A first terminal of the switching element 38$u$ on the side of the upper arm is connected to the cathode of the diode 36$u$ on the side of the upper arm. In the case that the switching elements 38, for example, are IGBTs, the first terminal is a collector. In the case that the switching elements 38, for example, are FETs, the first terminal is one of a source or a drain. A second terminal of the switching element 38$u$ on the side of the upper arm is connected to the anode of the diode 36$u$ on the side of the upper arm. In the case that the switching elements 38, for example, are IGBTs, the second terminal is an emitter. In the case that the switching elements 38, for example, are FETs, the second terminal is the other one of the source or the drain. A first terminal of the switching element 38$d$ on the side of the lower arm is connected to the cathode of the diode 36$d$ on the side of the lower arm. A second terminal of the switching element 38$d$ on the side of the lower arm is connected to the anode of the diode 36$d$ on the side of the lower arm.

A node 42A connected to the anode of the diode 36Au on the side of the upper arm, the second terminal of the switching element 38Au on the side of the upper arm, the cathode of the diode 36Ad on the side of the lower arm, and the first terminal of the switching element 38Ad on the side of the lower arm is connected to the wiring 32A.

A node 42B connected to the anode of the diode 36Bu on the side of the upper arm, the second terminal of the switching element 38Bu on the side of the upper arm, the cathode of the diode 36Bd on the side of the lower arm, and the first terminal of the switching element 38Bd on the side of the lower arm is connected to the wiring 32B.

A control circuit 46 is further provided in the control device 12 for the mobile body. The control circuit 46 is capable of performing a control with respect to the power conversion unit 28. More specifically, the control circuit 46 switches the switching elements 38 by applying a voltage to third terminals (gates) of the switching elements 38, on the basis of a signal (command) supplied from a later-described control device 18. An improvement in the power factor can be achieved by appropriately switching the switching elements 38.

Concerning the AC power supplied from the electrical power source device 20 to the power conversion unit 28, an improvement in the power factor thereof can be achieved by switching the switching elements 38. The AC power can be converted into DC power by the rectifier circuit that is constituted by the diodes 36Au, 36Ad, 36Bu, and 36Bd. In this manner, in the charging mode, the power conversion unit 28 is capable of functioning as a power factor correction (PFC: Power Factor Correction) circuit (or a power factor improvement circuit).

One end of the smoothing capacitor 44 is connected to the wiring 40A. Another end of the smoothing capacitor 44 is connected to the wiring 40B. The smoothing capacitor 44 is capable of smoothing the DC voltage between the pair of wirings 40A and 40B. More specifically, the smoothing capacitor 44 is capable of smoothing the DC voltage generated in the power conversion unit 28. The DC power after having been smoothed by the smoothing capacitor 44 can be supplied to the power conversion unit 50. The smoothing capacitor 44 is an intermediate capacitor positioned between the power conversion unit 28 and the power conversion unit 50.

By appropriately switching the switching elements 38, the control circuit 46 is capable of converting the DC power supplied from the side of the smoothing capacitor 44 into AC power. More specifically, by appropriately switching the switching elements 38, the control circuit 46 is capable of converting the DC power supplied from the side of the power conversion unit 50 into AC power. The AC power that is generated in this manner can be supplied to the electrical load 108 via the wirings 32A and 32B and the connector 24. In this manner, in the electrical power supplying mode, the power conversion unit 28 is capable of functioning as an inverter.

The charging and electrical power supplying unit 16 is further provided with a voltage sensor (detection unit) 48. One input terminal of the voltage sensor 48 is connected to the smoothing capacitor 44. Another input terminal of the voltage sensor 48 is connected to the smoothing capacitor 44. The voltage sensor 48 is capable of detecting a voltage of the smoothing capacitor 44. That is, the voltage sensor 48 is capable of detecting a voltage VB across the smoothing capacitor 44.

As noted previously, the power conversion unit 50 is equipped with the conversion unit 52, the isolation transformer 54, and the conversion unit 56.

The conversion unit 52 is capable of supplying the DC power supplied from the side of the smoothing capacitor 44 to the isolation transformer 54. More specifically, the conversion unit 52 is capable of supplying the DC power supplied from the side of the power conversion unit 28 to the isolation transformer 54.

The conversion unit 52 is equipped with power element units 60A and 60B respectively corresponding to a pair of wirings 58A and 58B that are connected to the isolation transformer 54. An H-bridge circuit is constituted by the power element units 60A and 60B.

The power element unit 60A corresponding to the wiring 58A is equipped with a diode 62Au on the side of an upper arm, a diode 62Ad on the side of a lower arm, a switching element 64Au on the side of the upper arm, and a switching element 64Ad on the side of the lower arm.

The power element unit 60B corresponding to the wiring 58B is equipped with a diode 62Bu on the side of an upper arm, a diode 62Bd on the side of a lower arm, a switching element 64Bu on the side of the upper arm, and a switching element 64Bd on the side of the lower arm.

When describing the diodes on the side of the upper arm in general, the reference numeral 62u will be used, and when describing the individual diodes on the side of the upper arm, the reference numerals 62Au and 62Bu will be used. Further, when describing the diodes on the side of the lower arm in general, the reference numeral 62d will be used, and when describing the individual diodes on the side of the lower arm, the reference numerals 62Ad and 62Bd will be used.

When describing the switching elements in general, the reference numeral 64 will be used, and when describing the individual switching elements, the reference numerals 64Au, 64Ad, 64Bu, and 64Bd will be used. Further, when describing the switching elements on the side of the upper arm in general, the reference numeral 64u will be used, and when describing the individual switching elements on the side of the upper arm, the reference numerals 64Au and 64Bu will be used. Further, when describing the switching elements on the side of the lower arm in general, the reference numeral 64d will be used, and when describing the individual switching elements on the side of the lower arm, the reference numerals 64Ad and 64Bd will be used.

As the switching elements 64, similar to the above-described switching elements 38, for example, insulated gate bipolar transistors can be used therefor, however, the switching elements 64 are not limited to this feature. FETs may also be used as the switching elements 64.

The diode 62u on the side of the upper arm and the diode 62d on the side of the lower arm are connected in series with each other. The cathode of the diode 62u on the side of the upper arm is connected to the wiring 40A. The anode of the diode 62u on the side of the upper arm is connected to the cathode of the diode 62d on the side of the lower arm. The anode of the diode 62d on the side of the lower arm is connected to the wiring 40B.

The switching element 64u on the side of the upper arm and the switching element 64d on the side of the lower arm are connected in series with each other. A first terminal of the switching element 64u on the side of the upper arm is connected to the cathode of the diode 62u on the side of the upper arm. In the case that the switching elements 64, for example, are IGBTs, the first terminal is a collector. In the case that the switching elements 64, for example, are FETs, the first terminal is one of a source or a drain. A second terminal of the switching element 64u on the side of the upper arm is connected to the anode of the diode 62u on the side of the upper arm. In the case that the switching elements 64, for example, are IGBTs, the second terminal is an emitter. In the case that the switching elements 64, for example, are FETs, the second terminal is the other one of the source or the drain. A first terminal of the switching element 64d on the side of the lower arm is connected to the cathode of the diode 62d on the side of the lower arm. A second terminal of the switching element 64d on the side of the lower arm is connected to the anode of the diode 62d on the side of the lower arm.

A node 66A connected to the anode of the diode 62Au on the side of the upper arm, the second terminal of the switching element 64Au on the side of the upper arm, the cathode of the diode 62Ad on the side of the lower arm, and the first terminal of the switching element 64Ad on the side of the lower arm is connected to the wiring 58A.

A node 66B connected to the anode of the diode 62Bu on the side of the upper arm, the second terminal of the switching element 64Bu on the side of the upper arm, the cathode of the diode 62Bd on the side of the lower arm, and the first terminal of the switching element 64Bd on the side of the lower arm is connected to the wiring 58B.

The control circuit 46 can implement a pulse width modulation (PWM) control with respect to the conversion unit 52. More specifically, the control circuit 46 switches the switching elements 64 by applying a voltage to third terminals (gates) of the switching elements 64, on the basis of a signal supplied from the control device 18. By the switching elements 64 being appropriately subjected to switching by the control circuit 46, the DC power supplied from the side of the smoothing capacitor 44 can be converted into AC power. More specifically, by the switching elements 64 being appropriately subjected to switching by the control circuit 46, the DC power supplied from the side of the power conversion unit 28 can be converted into AC power. The AC power that is generated in this manner can be supplied to the side of the isolation transformer 54 via the wirings 58A and 58B. In this manner, in the charging mode, the conversion unit 52 is capable of functioning as an inverter.

A rectifier circuit is constituted by the diodes 62Au, 62Ad, 62Bu, and 62Bd. The AC power supplied from the side of the isolation transformer 54 can be converted into DC power by the rectifier circuit that is constituted by the diodes 62Au, 62Ad, 62Bu, and 62Bd. The DC power that is generated in this manner can be supplied to the side of the smoothing capacitor 44 via the wirings 40A and 40B. More specifically, the DC power that is generated in this manner can be supplied to the side of the power conversion unit 28 via the wirings 40A and 40B.

By appropriately switching the switching elements 64, the control circuit 46 is capable of adjusting the voltage of the DC power supplied from the side of the isolation transformer 54 to the side of the smoothing capacitor 44. More specifically, by appropriately switching the switching elements 64, the control circuit 46 is capable of adjusting the voltage of the DC power supplied from the side of the isolation transformer 54 to the side of the power conversion unit 28. The AC power supplied from the side of the isolation transformer 54 can be converted in this manner into DC power by the conversion unit 52. In this manner, in the electrical power supplying mode, the conversion unit 52 is capable of functioning as a converter.

The smoothing capacitor 44 is capable of smoothing the DC voltage supplied from the side of the conversion unit 52. More specifically, the smoothing capacitor 44 is capable of smoothing the DC voltage that was rectified by the rectifier circuit constituted by the diodes 62Au, 62Ad, 62Bu, and 62Bd.

The isolation transformer 54 can be provided to electrically isolate the side of the conversion unit 52 and the side of the conversion unit 56 from each other.

The conversion unit 56 is capable of converting the AC power supplied from the side of the isolation transformer 54 into a DC voltage, and supplying the DC voltage to the side of the smoothing capacitor 68. More specifically, the conversion unit 56 is capable of converting the AC power supplied from the side of the isolation transformer 54 into a DC voltage, and supplying the DC voltage to the side of the rechargeable energy storage system 14.

The conversion unit 56 is equipped with power element units 72A and 72B respectively corresponding to a pair of wirings 70A and 70B that are connected to the isolation transformer 54. An H-bridge circuit is constituted by the power element units 72A and 72B.

The power element unit 72A corresponding to the wiring 70A is equipped with a diode 74Au on the side of an upper arm, a diode 74Ad on the side of a lower arm, a switching element 76Au on the side of the upper arm, and a switching element 76Ad on the side of the lower arm.

The power element unit 72B corresponding to the wiring 70B is equipped with a diode 74Bu on the side of an upper arm, a diode 74Bd on the side of a lower arm, a switching element 76Bu on the side of the upper arm, and a switching element 76Bd on the side of the lower arm.

When describing the diodes on the side of the upper arm in general, the reference numeral 74$u$ will be used, and when describing the individual diodes on the side of the upper arm, the reference numerals 74Au and 74Bu will be used. Further, when describing the diodes on the side of the lower arm in general, the reference numeral 74$d$ will be used, and when describing the individual diodes on the side of the lower arm, the reference numerals 74Ad and 74Bd will be used.

When describing the switching elements in general, the reference numeral 76 will be used, and when describing the individual switching elements, the reference numerals 76Au, 76Ad, 76Bu, and 76Bd will be used. Further, when describing the switching elements on the side of the upper arm in general, the reference numeral 76$u$ will be used, and when describing the individual switching elements on the side of the upper arm, the reference numerals 76Au and 76Bu will be used. Further, when describing the switching elements on the side of the lower arm in general, the reference numeral 76$d$ will be used, and when describing the individual switching elements on the side of the lower arm, the reference numerals 76Ad and 76Bd will be used.

As the switching elements 76, similar to the above-described switching elements 38 and 64, for example, insulated gate bipolar transistors can be used therefor, however, the switching elements 76 are not limited to this feature. FETs may also be used as the switching elements 76.

The diode 74$u$ on the side of the upper arm and the diode 74$d$ on the side of the lower arm are connected in series with each other. The cathode of the diode 74$u$ on the side of the upper arm is connected to one wiring 78A. The anode of the diode 74$u$ on the side of the upper arm is connected to the cathode of the diode 74$d$ on the side of the lower arm. The anode of the diode 74$d$ on the side of the lower arm is connected to one wiring 78B.

The switching element 76$u$ on the side of the upper arm and the switching element 76$d$ on the side of the lower arm are connected in series with each other. A first terminal of the switching element 76$u$ on the side of the upper arm is connected to the cathode of the diode 74$u$ on the side of the upper arm. In the case that the switching elements 76, for example, are IGBTs, the first terminal is a collector. In the case that the switching elements 76, for example, are FETs, the first terminal is one of a source or a drain. A second terminal of the switching element 76$u$ on the side of the upper arm is connected to the anode of the diode 74$u$ on the side of the upper arm. In the case that the switching elements 76, for example, are IGBTs, the second terminal is an emitter. In the case that the switching elements 76, for example, are FETs, the second terminal is the other one of the source or the drain. A first terminal of the switching element 76$d$ on the side of the lower arm is connected to the cathode of the diode 74$d$ on the side of the lower arm. A second terminal of the switching element 76$d$ on the side of the lower arm is connected to the anode of the diode 74$d$ on the side of the lower arm.

A node 80A connected to the anode of the diode 74Au on the side of the upper arm, the second terminal of the switching element 76Au on the side of the upper arm, the cathode of the diode 74Ad on the side of the lower arm, and the first terminal of the switching element 76Ad on the side of the lower arm is connected to the wiring 70A.

A node 80B connected to the anode of the diode 74Bu on the side of the upper arm, the second terminal of the switching element 76Bu on the side of the upper arm, the cathode of the diode 74Bd on the side of the lower arm, and the first terminal of the switching element 76Bd on the side of the lower arm is connected to the wiring 70B.

A rectifier circuit is constituted by the diodes 74Au, 74Ad, 74Bu, and 74Bd. The AC power supplied from the side of the isolation transformer 54 can be converted into DC power by the rectifier circuit that is constituted by the diodes 74Au, 74Ad, 74Bu, and 74Bd. The DC power that is generated in this manner can be supplied to the side of the smoothing capacitor 68 via the wirings 78A and 78B.

The control circuit 46 can implement a pulse width modulation control with respect to the conversion unit 56. More specifically, the control circuit 46 switches the switching elements 76 by applying a voltage to third terminals (gates) of the switching elements 76, on the basis of a signal supplied from the control device 18. By appropriately switching the switching elements 76, the control circuit 46 is capable of adjusting the voltage of the DC power supplied from the side of the isolation transformer 54 to the side of the smoothing capacitor 68. The AC power supplied from the side of the isolation transformer 54 can be converted in this manner into DC power by the conversion unit 56. In this manner, in the charging mode, the conversion unit 56 is capable of functioning as a converter.

By the switching elements 76 being appropriately subjected to switching by the control circuit 46, the DC power supplied from the side of the smoothing capacitor 68 can be converted into AC power. The AC power that is generated in this manner can be supplied to the side of the isolation transformer 54 via the wirings 70A and 70B. In this manner, in the electrical power supplying mode, the conversion unit 56 is capable of functioning as an inverter.

The smoothing capacitor 68 is provided on the side of the battery 88 with respect to the power conversion unit 50. One end of the smoothing capacitor 68 is connected to the wiring 78A. Another end of the smoothing capacitor 68 is connected to the wiring 78B. The smoothing capacitor 68 is capable of smoothing the DC voltage supplied from the side of the conversion unit 56. More specifically, the smoothing capacitor 68 is capable of smoothing the DC voltage that was rectified by the rectifier circuit constituted by the diodes 74Au, 74Ad, 74Bu, and 74Bd.

The charging and electrical power supplying unit 16 is further provided with a voltage sensor (detection unit) 82. One input terminal of the voltage sensor 82 is connected to the smoothing capacitor 68. Another input terminal of the voltage sensor 82 is connected to the smoothing capacitor 68. The voltage sensor 82 is capable of detecting a voltage of the smoothing capacitor 68. That is, the voltage sensor 82 is capable of detecting a voltage VDC across the smoothing capacitor 68.

The rechargeable energy storage system 14 includes a smoothing capacitor 84, a precharging circuit 86, and the battery 88.

The smoothing capacitor 84 is provided on the side of the control device 12 for the mobile body with respect to the battery 88. One end of the smoothing capacitor 84 is connected to the wiring 78A. Another end of the smoothing capacitor 84 is connected to the wiring 78B.

The precharging circuit 86 is provided, for example, on the wiring 78A at a location between the battery 88 and the smoothing capacitor 84. The precharging circuit 86 comprises a resistor 90, a switch 92, and a switch 94.

The switch 94 is provided, for example, on the wiring 78A at a location between the battery 88 and the smoothing capacitors 68 and 84. As the switch 94, for example, a relay contact or the like can be used, however, the switch 94 is not limited to this feature.

The resistor 90 is connected in parallel with the switch 94. The switch 92 is connected in series with the resistor 90. As the switch 92, for example, a relay contact or the like can be used, however, the switch 92 is not limited to this feature. One end of the resistor 90 is electrically connected to one end of the battery 88. Another end of the resistor 90 is connected to one end of each of the smoothing capacitors 68 and 84 via the switch 92 and the wiring 78A.

When the switch 92 is turned on, the other end of the resistor 90 can be connected to the smoothing capacitors 68 and 84 via the wiring 78A. On the other hand, when the switch 92 is turned off, a state is brought about in which the other end of the resistor 90 is not connected to the smoothing capacitors 68 and 84.

When the switch 94 is turned on in a state in which the switch 92 is turned on, a state is brought about in which both ends of the resistor 90 are short-circuited. When the switch 94 is turned off, a state is brought about in which both ends of the resistor 90 are not short-circuited.

When supply of the DC power from the side of the battery 88 to the charging and electrical power supplying unit 16 is initiated, the switch 92 is turned on in a state in which the switch 94 is turned off. When the switch 92 is turned on in a state in which the switch 94 is turned off, the electrical power from the battery 88 is supplied to the smoothing capacitors 68 and 84 via the resistor 90. Therefore, the supply of electrical power from the side of the battery 88 to the smoothing capacitors 68 and 84 is limited by the resistor 90. Since the supply of electrical power from the side of the battery 88 to the smoothing capacitors 68 and 84 is limited by the resistor 90, it is possible to prevent a large inrush current from flowing into the smoothing capacitors 68 and 84. After the smoothing capacitors 68 and 84 have been fully charged, the switch 94 can be closed.

A switch 96 is provided on the wiring 78B at a location between the battery 88 and the smoothing capacitor 84. As the switch 96, for example, a relay contact or the like can be used, however, the switch 96 is not limited to this feature.

The rechargeable energy storage system 14 is further provided with a voltage sensor (detection unit) 97. One input terminal of the voltage sensor 97 is connected to one end of the battery 88. Another input terminal of the voltage sensor 97 is connected to another end of the battery 88. The voltage sensor 97 is capable of detecting a voltage of the battery 88. That is, the voltage sensor 97 is capable of detecting a voltage VES across the battery 88.

In this instance, although an exemplary case has been described in which the rechargeable energy storage system 14 includes the battery 88, the voltage sensor 97, the precharging circuit 86, and the switch 96, the present invention is not limited to this feature. The rechargeable energy storage system 14 may include the battery 88 and the voltage sensor 97, but the precharging circuit 86 and the switch 96 may be provided separately from the rechargeable energy storage system 14.

The control device 18 is further provided in the control device 12 for the mobile body. The control device 18 controls the control device 12 for the mobile body in its entirety. The control device 18 is equipped with a computation unit 98 and a storage unit 100. The computation unit 98 may be configured by a processor such as a CPU (Central Processing Unit) or the like, however, the present invention is not limited to this feature. The storage unit 100 is equipped, for example, with a volatile memory and a nonvolatile memory, neither of which are shown. Examples of the volatile memory include, for example, a RAM (Random Access Memory) or the like. Examples of the nonvolatile memory include, for example, a ROM (Read Only Memory), a flash memory, or the like. Programs, data, tables, etc., can be stored in the storage unit 100.

The computation unit 98 is equipped with the control unit 102, and a failure determination unit (failure detection unit) 104. The control unit 102 and the failure determination unit 104 can be realized by programs stored in the storage unit 100 being executed by the computation unit 98.

The control unit 102 is capable of controlling the charging and electrical power supplying unit 16. In the case that charging the battery 88 is carried out using electrical power supplied from the electrical power source device 20, the control unit 102 can implement the following controls. That is, in the case that the operation mode is a charging mode, the control unit 102 can implement the following controls. In this case, the control unit 102 completes precharging the smoothing capacitor 44 and the smoothing capacitors 68 and 84 using the electrical power supplied from the battery 88, before the electrical power from the electrical power source device 20 starts to be supplied to the charging and electrical power supplying unit 16.

After the precharging of the smoothing capacitor 68 and the precharging of the smoothing capacitor 84 are completed, the control unit 102 can perform the precharging of the smoothing capacitor 44. More specifically, after the precharging of the smoothing capacitor 68 and the precharging of the smoothing capacitor 84 are completed, the control unit 102 can perform precharging of the smoothing capacitor 44 in a state in which the switch 94 is turned on.

The control unit 102 can also perform the precharging the smoothing capacitor 44 and the smoothing capacitor 68 and 84 simultaneously. When the switch 92 is turned on in a state in which the switch 94 is turned off, electrical power is supplied through the resistor 90, and then the smoothing capacitor 44 and the smoothing capacitors 68 and 84 are precharged simultaneously.

The control device 18 is further equipped with a communication unit 106 for carrying out communications with the electrical power source device 20. After the precharging of the smoothing capacitor 44 and the precharging of the smoothing capacitors 68 and 84 are completed, the control unit 102 can implement the following controls. That is, in this case, the control unit 102 can transmit to the electrical power source device 20 through the communication unit 106 information showing that the precharging of the smoothing capacitor 44 and the precharging of the smoothing capacitors 68 and 84 are completed.

The failure determination unit 104 can execute a failure determination of the charging and electrical power supplying unit 16. More specifically, the failure determination unit 104 can execute a failure determination of the charging and electrical power supplying unit 16 based on information supplied from the voltage sensors 27, 48, 82, 97, and the like. The voltage of AC power output from the electrical power source device 20 cannot be correctly measured by the voltage sensor 27, if the measurement is not made after electrical power from the electrical power source device 20 starts to be supplied to the charging and electrical power supplying unit 16. Therefore, the control unit 102 permits the failure determination unit 104 to execute the failure determination after electrical power from the electrical power source device 20 starts to be supplied to the charging and electrical power supplying unit 16.

When charging the mobile body 10 is carried out using electrical power supplied from the electrical power source device 20, for example, the control according to SAE J1772 standard can be implemented. In this instance, an exemplary case will be described in which the control according to SAE J1772 standard is implemented, although the present invention is not limited to this feature.

Figure 2:
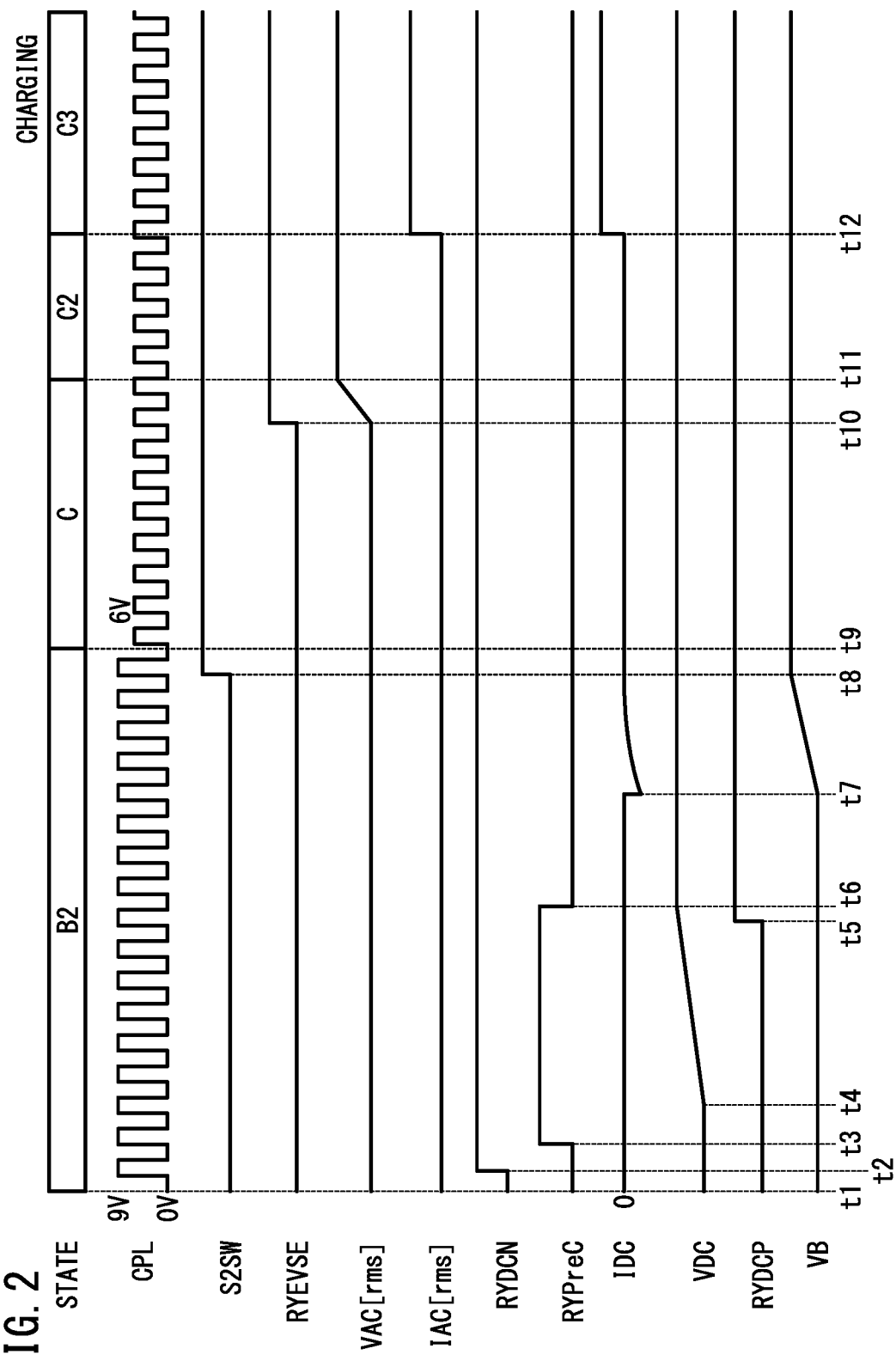
FIG. 2 is a time chart showing operations of the control device for the mobile body according to the embodiment.

FIG. 2 is a time chart showing operations of the control device for the mobile body according to the present embodiment. FIG. 2 illustrates an exemplary case in which after the precharging of the smoothing capacitor 68 side is completed, the smoothing capacitor 44 is precharged.

The operations of the control device 12 for the mobile body before a state B2 conform to the SAE J1772 standard. The state B2 is a state in which the electrical power source device 20 is connected to the mobile body 10, and in which the preparation for charging is completed in the electrical power source device 20, but in which the preparation for charging is not completed in the mobile body 10. A state C is a state in which the electrical power source device 20 is connected to the mobile body 10, and in which preparation for charging is completed in both the mobile body 10 and the electrical power source device 20. A control pilot signal CPL is an electric signal output from the electrical power source device 20.

When preparation for charging is completed in the electrical power source device 20 at timing t1, the state B2 is brought about. As described above, the state B2 is a state in which the electrical power source device 20 is connected to the mobile body 10 and in which the preparation for charging is completed in the electrical power source device 20, but in which the preparation for charging is not completed in the mobile body 10. At timing t1, transmission of a control pilot signal CPL is started, indicating the amount of current that can be supplied. The control pilot signal CPL is an electric signal output from the electrical power source device 20.

At timing t2, the control unit 102 causes a signal RYDCN to transition from an L level to an H level. The signal RYDCN is a signal for controlling ON/OFF of the switch 96. When the signal RYDCN transitions to the H level, the switch 96 is turned on.

At timing t3, the control unit 102 causes a signal RYPreC to transition from an L level to an H level. The signal RYPreC is a signal for controlling ON/OFF of the switch 92. When the signal RYPreC transitions to the H level, the switch 92 is turned on.

At timing t4, the voltage VDC across the smoothing capacitors 68 and 84 starts to rise. Since electrical power is supplied to the smoothing capacitors 68 and 84 via the resistor 90 provided in the precharging circuit 86, the potential at ends of the smoothing capacitors 68 and 84 gradually increases. That is, a large inrush current is prevented from flowing into the smoothing capacitors 68 and 84.

At timing t5, the control unit 102 causes a signal RYDCP to transition from an L level to an H level. The signal RYDCP is a signal for controlling ON/OFF of the switch 94. When the signal RYDCP transitions to the H level, the switch 94 is turned on.

At timing t6, the control unit 102 causes the signal RYPreC to transition to the L level. When the signal RYPreC transitions to the L level, the switch 92 is turned off.

At timing t7, precharging of the smoothing capacitor 44 is started using electrical power supplied from the battery 88. At this time, the control unit 102 appropriately controls the power conversion unit 50 to supply DC power to the smoothing capacitor 44. While the smoothing capacitor 44 is being precharged, a DC current IDC is supplied from the battery 88 toward the power conversion unit 50. The DC voltage supplied from the power conversion unit 50 to the smoothing capacitor 44 gradually increases. That is, the voltage VB across the smoothing capacitor 44 gradually increases. Since the DC voltage supplied from the power conversion unit 50 to the smoothing capacitor 44 gradually increases, a large inrush current is prevented from flowing into the smoothing capacitor 44.

At timing t8, the control unit 102 causes a signal S2SW to transition from an L level to an H level. The signal S2SW is a signal indicating that preparation for charging is completed in the mobile body 10. In other words, the signal S2SW is a signal indicating that the precharging of the smoothing capacitor 44 and the precharging of the smoothing capacitors 68 and 84 are completed. The control unit 102 transmits the signal S2SW to the electrical power source device 20 via the communication unit 106.

At timing t9, the state B2 transitions to the state C. As described above, the state C is a state in which the electrical power source device 20 is connected to the mobile body 10 and in which preparation for charging is completed in both the mobile body 10 and the electrical power source device 20.

At timing t10, the electrical power source device 20 causes a signal RYEVSE to transition from an L level to an H level. The signal RYEVSE is a signal for controlling ON/OFF of the switches 25A and 25B. When the signal RYEVSE transitions to the H level, the switches 25A and 25B are turned on. When the switches 25A and 25B are turned on, the AC power from the AC power source 26 is supplied to the control device 12 for the mobile body. When the switches 25A and 25B are turned on, the voltage VAC of the AC power supplied from the electrical power source device 20 increases.

At timing t11, the state C transitions to a state C2. The state C2 is a state in which supply of AC power from the electrical power source device 20 to the charging and electrical power supplying unit 16 is started, but in which supply of electrical power to the power conversion unit 28 and the like is not started.

At timing t12, a state is brought about in which the direct current IDC is supplied from the charging and electrical power supplying unit 16 to the rechargeable energy storage system 14. At timing t12, an alternating current IAC starts to be supplied from the electrical power source device 20 to the charging and electrical power supplying unit 16. At timing t12, the state C2 transitions to a state C3. The state C3 is a state in which the battery 88 is being charged. In the state C3, the control unit 102 permits the failure determination unit 104 to execute the failure determination.

Thus, in the example shown in FIG. 2, the smoothing capacitor 44 is precharged after the precharging of the smoothing capacitors 68, 84 side is completed.

Figure 3:
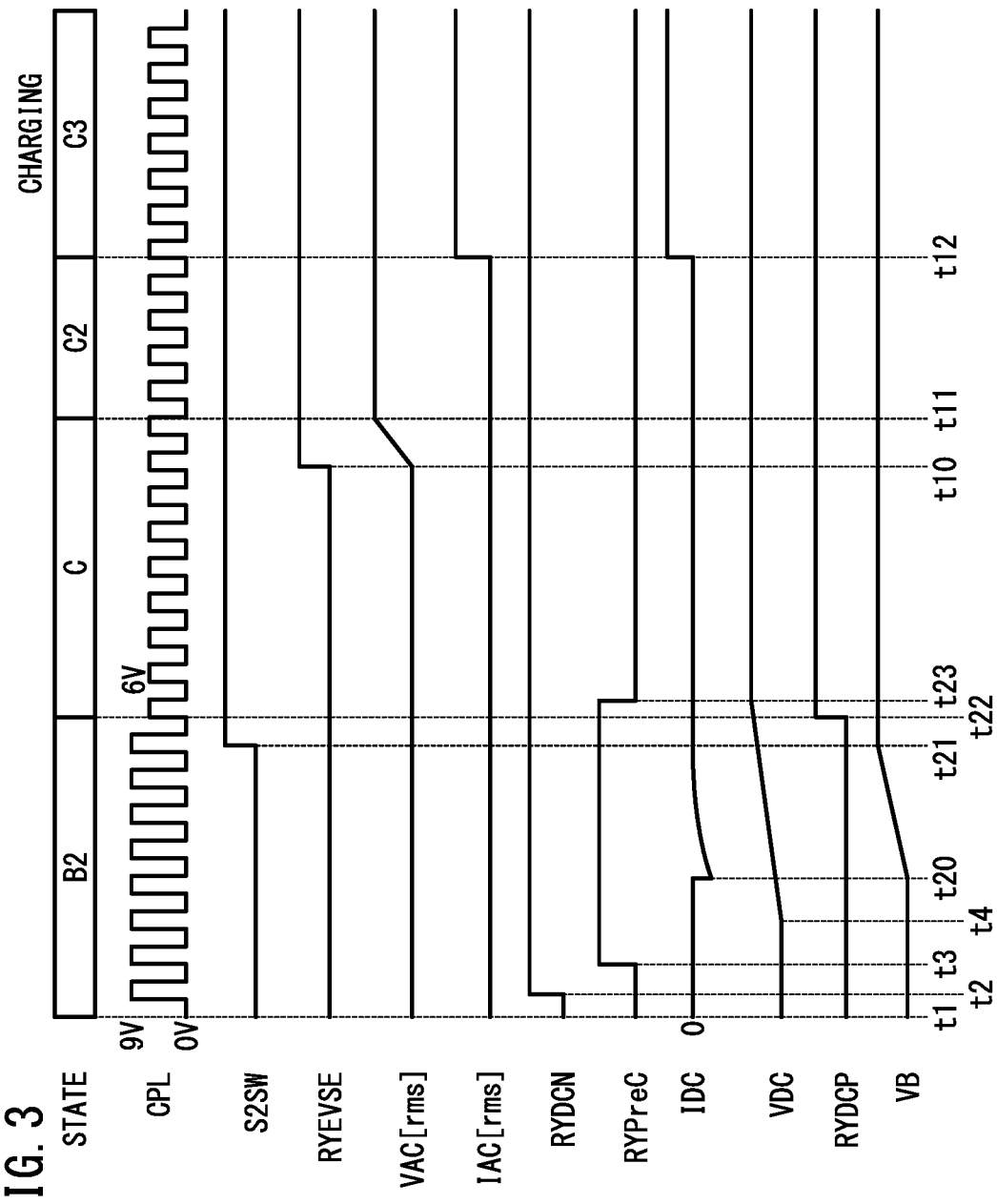
FIG. 3 is a time chart showing another example of operations of the control device for the mobile body according to the embodiment.

FIG. 3 is a time chart showing another example of the operations of the control device for the mobile body according to the present embodiment. FIG. 3 shows an example in which the precharging of the smoothing capacitors 68 and 84 side and the precharging of the smoothing capacitor 44 are performed simultaneously.

The operations from timing t1 to timing t4 are the same as those in the example described above with reference to FIG. 2. At timing t3, as described above, the control unit 102 causes the signal RYPreC to transition from the L level to the H level. When the signal RYPreC transitions to the H level, the switch 92 is turned on. At timing t4, as described above, the voltage VDC across the smoothing capacitors 68 and 84 starts to increase. Since electrical power is supplied to the smoothing capacitors 68 and 84 via the resistor 90 provided in the precharging circuit 86, the potential at ends of the smoothing capacitors 68 and 84 gradually increases. That is, a large inrush current is prevented from flowing into the smoothing capacitors 68 and 84.

At timing t20, the precharging of the smoothing capacitor 44 is started using electrical power supplied from the battery 88. At this time, the control unit 102 appropriately controls the power conversion unit 50 to supply DC power to the smoothing capacitor 44. While the smoothing capacitor 44 is being precharged, the DC current IDC is supplied from the battery 88 toward the power conversion unit 50. The DC voltage supplied from the power conversion unit 50 to the smoothing capacitor 44 side gradually increases. That is, the voltage VB across the smoothing capacitor 44 gradually increases. Since the DC voltage supplied from the power conversion unit 50 to the smoothing capacitor 44 gradually increases, a large inrush current is prevented from flowing into the smoothing capacitor 44.

At timing t21, the control unit 102 causes the signal S2SW to transition from the L level to the H level. The signal S2SW is a signal indicating that preparation for charging is completed in the mobile body 10. In other words, the signal S2SW is a signal indicating that the precharging of the smoothing capacitor 44 and the precharging of the smoothing capacitors 68 and 84 are completed. The control unit 102 transmits the signal S2SW to the electrical power source device 20 via the communication unit 106.

At timing t22, control unit 102 causes the signal RYDCP to transition from the L level to the H level. As described above, the signal RYDCP is a signal for controlling ON/OFF of the switch 94. When the signal RYDCP transitions to the H level, the switch 94 is turned on. At timing t22, a state B2 transitions to a state C. As described above, the state C is a state in which the electrical power source device 20 is connected to the mobile body 10 and in which preparation for charging is completed in both the mobile body 10 and the electrical power source device 20.

At timing t23, control unit 102 causes the signal RYPreC to transition to the L level. When the signal RYPreC transitions to the L level, the switch 92 is turned off.

After the timing t10, it is the same as the example described above with reference to FIG. 2.

In this manner, the precharging of the smoothing capacitors 68 and 84 side and the precharging of the smoothing capacitor 44 may be performed simultaneously. As can be seen from the comparison between FIGS. 2 and 3, according to the example shown in FIG. 3, the period of the state B2 can be shortened as compared with the example shown in FIG. 2. Therefore, according to the example shown in FIG. 3, charging of the battery 88 can be started more quickly.

As described above, according to the present embodiment, when the battery 88 is charged using the electrical power supplied from the electrical power source device 20, the following processes are performed before the electrical power from the electrical power source device 20 starts to be supplied to the charging and electrical power supplying unit 16. That is, the electrical power supplied from the battery 88 is used to precharge the smoothing capacitor 44 and the smoothing capacitors 68 and 84. According to the present embodiment, since the precharging of the smoothing capacitor 44 and the precharging of the smoothing capacitors 68 and 84 are performed using the electrical power supplied from the battery 88, it is not necessary to provide a precharging circuit between the connector 24 and the smoothing capacitor 44. Therefore, according to the present embodiment, it is possible to provide the control device 12 for the mobile body that can realize downsizing without causing a decrease in reliability.

The present invention is not limited to the above-described embodiments, and various configurations can be adopted therein without departing from the essence and gist of the present invention.

The above-described embodiments can be summarized in the following manner.

The control device (12) for the mobile body includes the charging and electrical power supplying unit (16) configured to convert AC power supplied from the electrical power source device (20) positioned externally of the mobile body (10) via the connector (24) into DC power to charge the battery (88) provided in the mobile body, and configured to convert DC power supplied from the battery into AC power to supply the AC power to the electrical load (108) positioned externally of the mobile body, the charging and electrical power supplying unit including the first smoothing capacitor (44) positioned on a connector side and the second smoothing capacitor (68) positioned on a battery side, and the control unit (102) configured to control the charging and electrical power supplying unit, wherein in the case that the battery is charged using electrical power supplied from the electrical power source device, the control unit completes precharging the first smoothing capacitor and the second smoothing capacitor using electrical power supplied from the battery, before the electrical power from the electrical power source device starts to be supplied to the charging and electrical power supplying unit. According to such a configuration, when the battery is charged using the electrical power supplied from the electrical power source device, the following processes are performed before the electrical power from the electrical power source device starts to be supplied to the charging and electrical power supplying unit. That is, the electrical power supplied from the battery is used to precharge the first smoothing capacitor and the second smoothing capacitor. According to the configuration, since the precharging of the first smoothing capacitor and the precharging of the second smoothing capacitor are performed using the electrical power supplied from the battery, it is not necessary to provide a precharging circuit between the connector and the smoothing capacitor. Therefore, according to the present embodiment, it is possible to provide the control device for the mobile body that can realize downsizing without causing a decrease in reliability.

The charging and electrical power supplying unit may include the isolation transformer (54), the first smoothing capacitor may be positioned on the connector side with respect to the isolation transformer, and the second smoothing capacitor may be positioned on the battery side with respect to the isolation transformer.

The charging and electrical power supplying unit may include: the first power conversion unit (28) provided between the connector and the first smoothing capacitor, configured to convert AC power supplied from the electrical power source device into DC power to supply the DC power to a first smoothing capacitor side, and configured to convert DC power supplied from the first smoothing capacitor side into AC power to supply the AC power to the connector side; and the second power conversion unit (50) provided between the first smoothing capacitor and the second smoothing capacitor, and configured to transfer and receive electrical power via the isolation transformer, wherein the first smoothing capacitor may be an intermediate capacitor positioned between the first power conversion unit and the second power conversion unit.

The switch (94) may be provided between the battery and the second smoothing capacitor, the resistor (90) configured to limit electrical power supplied to the second smoothing capacitor may be connected in parallel with the switch, the control unit may perform the precharging of the second smoothing capacitor by supplying electrical power to the second smoothing capacitor via the resistor in a state in which the switch is turned off.

After the precharging of the second smoothing capacitor is completed, the control unit may perform the precharging of the first smoothing capacitor.

After the precharging of the second smoothing capacitor is completed, the control unit may perform the precharging of the first smoothing capacitor in a state in which the switch is turned on.

The control unit may perform the precharging of the first smoothing capacitor and the precharging of the second smoothing capacitor simultaneously, by supplying the electrical power via the resistor in the state in which the switch is turned off. Therefore, according to such a configuration, charging of the battery can be started more quickly.

The communication unit (106) configured to carry out communication with the electrical power source device may be further included, wherein after the precharging of the first smoothing capacitor and the precharging of the second smoothing capacitor are completed, the control unit may transmit to the electrical power source device through the communication unit information showing that the precharging of the first smoothing capacitor and the precharging of the second smoothing capacitor are completed.

The failure determination unit (104) configured to execute a failure determination of the charging and electrical power supplying unit is further included, wherein the control unit may permit the failure determination unit to execute the failure determination after electrical power from the electrical power source device starts to be supplied to the charging and electrical power supplying unit. After the electrical power from the electrical power source device starts to be supplied to the charging and electrical power supplying unit, the voltage at each part can reliably be measured by a voltage sensor and the like. Thus, the failure determination can be performed accurately.

The mobile body is equipped with the control device for the mobile body as described above.

In a method of controlling a control device for a mobile body equipped with a charging and electrical power supplying unit configured to convert AC power supplied from an electrical power source device positioned externally of the mobile body via a connector into DC power to charge a battery provided in the mobile body, and configured to convert DC power supplied from the battery into AC power to supply the AC power to an electrical load positioned externally of the mobile body, the charging and electrical power supplying unit including a first smoothing capacitor positioned on a connector side and a second smoothing capacitor positioned on a battery side, the method includes performing (B2) precharging of the first smoothing capacitor and precharging of the second smoothing capacitor using electrical power supplied from the battery, before electrical power from the electrical power source device starts to be supplied to the charging and electrical power supplying unit, and starting to supply electrical power to the charging and electrical power supplying unit from the electrical power source device and charging (C3) the battery using the electrical power supplied from the electrical power source device, after the precharging of the first smoothing capacitor and the precharging of the second smoothing capacitor are completed.

What is claimed is:

1. A control device for a mobile body, comprising:
a charging and electrical power supplying unit configured to convert AC power supplied from an electrical power source device positioned externally of the mobile body via a connector into DC power to charge a battery provided in the mobile body, and configured to convert DC power supplied from the battery into AC power to supply the AC power to an electrical load positioned externally of the mobile body, the charging and electrical power supplying unit including a first smoothing capacitor positioned on a connector side and a second smoothing capacitor positioned on a battery side; and
a control unit configured to control the charging and electrical power supplying unit,
wherein in a case that the battery is charged using electrical power supplied from the electrical power source device, the control unit completes precharging the first smoothing capacitor and the second smoothing capacitor using electrical power supplied from the battery, before the electrical power from the electrical power source device starts to be supplied to the charging and electrical power supplying unit.

2. The control device for the mobile body according to claim 1, wherein the charging and electrical power supplying unit includes an isolation transformer, the first smoothing capacitor is positioned on the connector side with respect to the isolation transformer, and the second smoothing capacitor is positioned on the battery side with respect to the isolation transformer.

3. The control device for the mobile body according to claim 2, wherein the charging and electrical power supplying unit includes:
  a first power conversion unit provided between the connector and the first smoothing capacitor, configured to convert AC power supplied from the electrical power source device into DC power to supply the DC power to a first smoothing capacitor side, and configured to convert DC power supplied from the first smoothing capacitor side into AC power to supply the AC power to the connector side; and
  a second power conversion unit provided between the first smoothing capacitor and the second smoothing capacitor, and configured to transfer and receive electrical power via the isolation transformer,
  wherein the first smoothing capacitor is an intermediate capacitor positioned between the first power conversion unit and the second power conversion unit.

4. The control device for the mobile body according to claim 1, wherein a switch is provided between the battery and the second smoothing capacitor,
  a resistor configured to limit electrical power supplied to the second smoothing capacitor is connected in parallel with the switch,
  the control unit performs the precharging of the second smoothing capacitor by supplying electrical power to the second smoothing capacitor via the resistor in a state in which the switch is turned off.

5. The control device for the mobile body according to claim 4, wherein after the precharging of the second smoothing capacitor is completed, the control unit performs the precharging of the first smoothing capacitor.

6. The control device for the mobile body according to claim 5, wherein after the precharging of the second smoothing capacitor is completed, the control unit performs the precharging of the first smoothing capacitor in a state in which the switch is turned on.

7. The control device for the mobile body according to claim 4, wherein the control unit performs the precharging of the first smoothing capacitor and the precharging of the second smoothing capacitor simultaneously, by supplying the electrical power via the resistor in the state in which the switch is turned off.

8. The control device for the mobile body according to claim 1, further comprising a communication unit configured to carry out communication with the electrical power source device,
  wherein after the precharging of the first smoothing capacitor and the precharging of the second smoothing capacitor are completed, the control unit transmits to the electrical power source device through the communication unit information showing that the precharging of the first smoothing capacitor and the precharging of the second smoothing capacitor are completed.

9. The control device for the mobile body according to claim 1, further comprising a failure determination unit configured to execute a failure determination of the charging and electrical power supplying unit,
  wherein the control unit permits the failure determination unit to execute the failure determination after electrical power from the electrical power source device starts to be supplied to the charging and electrical power supplying unit.

10. A mobile body equipped with a control device for the mobile body, the control device comprising:
  a charging and electrical power supplying unit configured to convert AC power supplied from an electrical power source device positioned externally of the mobile body via a connector into DC power to charge a battery provided in the mobile body, and configured to convert DC power supplied from the battery into AC power to supply the AC power to an electrical load positioned externally of the mobile body, the charging and electrical power supplying unit including a first smoothing capacitor positioned on a connector side and a second smoothing capacitor positioned on a battery side; and
  a control unit configured to control the charging and electrical power supplying unit,
  wherein in a case that the battery is charged using electrical power supplied from the electrical power source device, the control unit completes precharging the first smoothing capacitor and the second smoothing capacitor using electrical power supplied from the battery, before the electrical power from the electrical power source device starts to be supplied to the charging and electrical power supplying unit.

* * * * *